United States Patent
Jung et al.

(10) Patent No.: US 7,783,198 B2
(45) Date of Patent: Aug. 24, 2010

(54) PASSIVE OPTICAL NETWORK

(75) Inventors: Dae-Kwang Jung, Suwon-si (KR);
Yun-Je Oh, Yongin-si (KR); Jin-Woo Park, Seoul (KR); Sang-Rok Lee, Seoul (KR); Il-Lae Kim, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 732 days.

(21) Appl. No.: 11/646,736

(22) Filed: Dec. 28, 2006

(65) Prior Publication Data

US 2007/0183778 A1     Aug. 9, 2007

(30) Foreign Application Priority Data

Feb. 3, 2006    (KR) ............... 10-2006-0010568

(51) Int. Cl.
*H04J 14/00* (2006.01)
(52) U.S. Cl. ............... 398/82; 398/67; 398/70; 398/71; 398/72; 398/76
(58) Field of Classification Search ........... 398/66, 398/67, 69–72, 76, 82, 158, 168
See application file for complete search history.

(56) References Cited

U.S. PATENT DOCUMENTS

| 6,493,335 | B1 * | 12/2002 | Darcie et al. ............ 370/344 |
| 6,895,185 | B1 * | 5/2005 | Chung et al. ............ 398/72 |
| 7,340,170 | B2 * | 3/2008 | Park et al. ............ 398/67 |

FOREIGN PATENT DOCUMENTS

| KR | 2004-82029 | 9/2004 |
| KR | 2005-10101 | 1/2005 |
| KR | 2005-118863 | 12/2005 |

* cited by examiner

*Primary Examiner*—Dalzid Singh
(74) *Attorney, Agent, or Firm*—Cha & Reiter, LLC

(57) ABSTRACT

A passive optical network includes: a central office for generating multiplexed downstream optical signals and receiving an upstream optical signal; a plurality of optical network units for receiving a corresponding downstream optical signal and generating subcarrier channels carrying electrical data of an assigned frequency; and a remote node for photoelectrically converting the channels into electrical data, electro-optically converting the electrical data into at least one upstream optical signal.

12 Claims, 4 Drawing Sheets

PASSIVE OPTICAL NETWORK

CLAIM OF PRIORITY

This application claims priority to an application entitled "Passive Optical Network," filed in the Korean Intellectual Property Office on Feb. 3, 2006 and assigned Serial No. 2006-10568, the contents of which are hereby incorporated by reference.

BACKGROUND OF THE INVENTION

1. Field of the Invention

The present invention relates to a Passive Optical Network (PON), and more particularly to a Wavelength Division Multiplexing (WDM) PON.

2. Description of the Related Art

An optical fiber cable is effective means for processing a large amount of information at ultra high speed network, such as a Fiber To The Curb (FTTC), a Fiber To The Home (FTTH), etc. A widely used PON includes one central office for providing a service to a plurality of Optical Network Units (ONUs). A PON may employ a WDM scheme, a Time Division Multiplexing (TDM) scheme and a Subcarrier Multiplexing (SCM) scheme. In the WDM scheme, a plurality of lights with different wavelengths are assigned to each ONU. In the TDM scheme, a light with the same wavelength is split according to the time slots and the split time slots are assigned to each ONU. In the SCM scheme, a light with the same wavelength is split according to different frequencies, and the split frequencies are assigned to each ONU.

FIG. 1 illustrates a SCM/WDM PON according to the prior art. As shown, the PON 100 includes a central office 110, a remote node 120, and a plurality of ONUs 130-1 to 130-M.

The central office 110 includes a plurality of downstream light sources 111-1 to 111-N for generating downstream optical signals with different wavelengths; a plurality of upstream receivers 112-1 to 112-N for detecting data from an upstream optical signal with a corresponding wavelength; a multiplexer/demultiplexer 114 for multiplexing the downstream optical signals to output the multiplexed downstream optical signals to the remote node 120, and demultiplexing multiplexed upstream optical signals; and wavelength-selective couplers 113-1 to 113-N.

Each of the downstream light sources 111-1 to 111-N generates a downstream optical signal including SCM downstream channels. The upstream receivers 112-1 to 112-N detect necessary data from SCM upstream channels constituting an upstream optical signal with a corresponding wavelength. The wavelength-selective couplers 113-1 to 113-N couple the corresponding downstream light sources 111-1 to 111-N and the corresponding upstream receivers 112-1 to 112-N to the multiplexer/demultiplexer 114. The multiplexer/demultiplexer 114 multiplexes downstream optical signals to output the multiplexed downstream optical signals to the remote node 120, and demultiplexes upstream optical signals multiplexed by the remote node 120 to output the demultiplexed upstream optical signals to each of the upstream receivers 112-1 to 112-N through the corresponding wavelength-selective couplers 113-1 to 113-N.

The remote node 120 includes a multiplexer/demultiplexer 121 for demultiplexing multiplexed downstream optical signals and multiplexing the upstream optical signals, and a plurality of optical splitters 122-1 to 122-N for splitting the demultiplexed downstream optical signal with a corresponding wavelength according to intensities, and outputting the split optical signals to the corresponding ONUs 130-1 to 130-M.

Each of the ONUs 130-1 to 130-M includes a wavelength-selective coupler 131 linked to each corresponding optical splitter 122-1 to 122-N of the remote node 120, a downstream receiver 132 for receiving SCM channels belonging to an assigned frequency band from received downstream optical signals, and an upstream light source 133 for generating upstream optical signals. The downstream receiver 132 further includes a filter for detecting a channel of the assigned frequency band. Further, the upstream light source 133 loads data on an upstream channel with an assigned frequency to transmit the loaded data, and the optical splitter of the remote node combines upstream channels input from corresponding ONUs into an upstream optical signal.

However, a conventional ONU currently must use an expensive analog distributed feedback laser. That is, an ONU must pay increased installation cost.

SUMMARY OF THE INVENTION

Accordingly, the present invention has been made to solve the above-mentioned problems occurring in the prior art by providing an economical PON.

In accordance with one aspect of the present invention, there is provided an PON including: a central office for generating multiplexed downstream optical signals and receiving an upstream optical signal; a plurality of optical network units for receiving a corresponding downstream optical signal and generating subcarrier channels carrying electrical data of an assigned frequency; and a remote node for photoelectrically converting the channels into electrical data, electro-optically converting the electrical data into at least one upstream optical signal.

BRIEF DESCRIPTION OF THE DRAWINGS

The above features and advantages of the present invention will be more apparent from the following detailed description taken in conjunction with the accompanying drawings, in which.

DETAILED DESCRIPTION

Exemplary embodiments of the present invention will be described in detail herein below with reference to the accompanying drawings. For the purposes of clarity and simplicity, a detailed description of known functions and configurations incorporated herein will be omitted as it may obscure the subject matter of the present invention.

Figure 1:
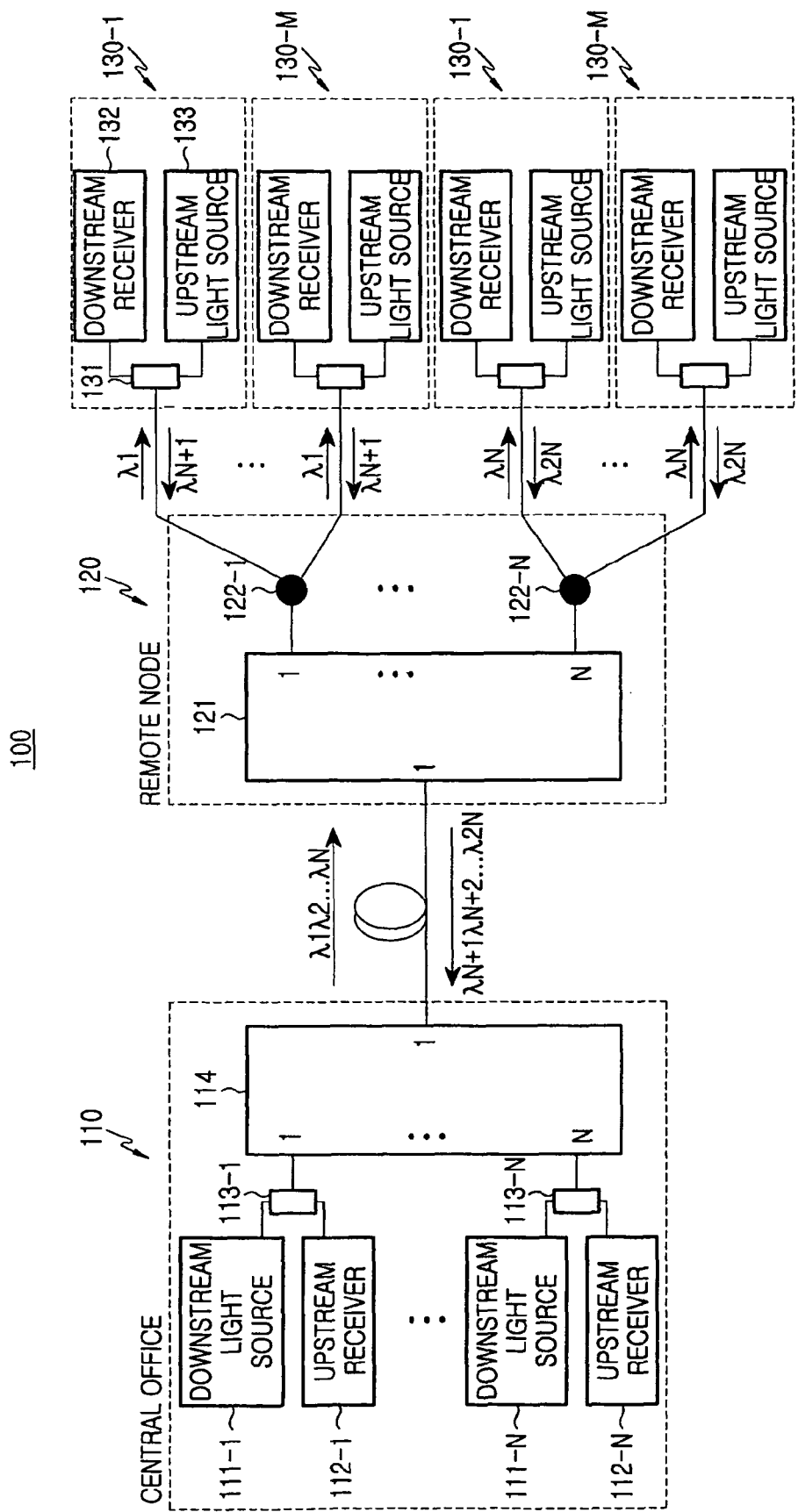
FIG. 1 is a diagram illustrating a PON according to the prior art.
Figure 2:
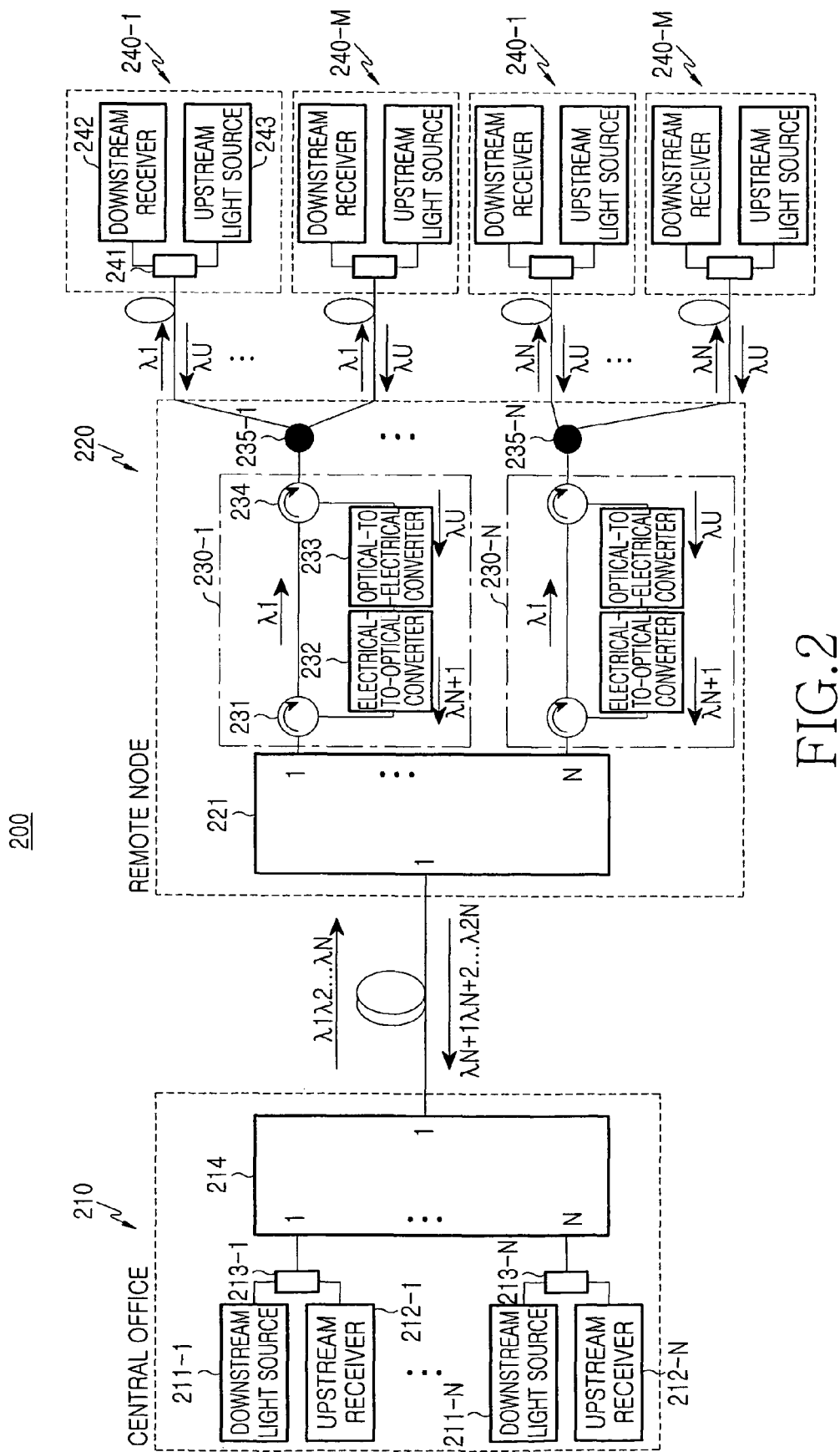
FIG. 2 is a diagram illustrating a PON according to a first embodiment of the present invention.

FIG. 2 is a diagram illustrating a PON according to a first embodiment of the present invention. As shown, the PON 200 according to the present embodiment includes a central office 210 for generating multiplexed downstream optical signals with different wavelengths and receiving a multiplexed upstream optical signal, a plurality of ONUs 240-1 to 240-M for receiving a downstream optical signal with a corresponding wavelength and generating an upstream subcarrier channel carrying electrical data of an assigned frequency, and a remote node 220 for photoelectrically converting the upstream channels into each electrical data and electro-optically converting the electrical data into at least one upstream optical signal.

The central office 210 includes a plurality of downstream light sources 211-1 to 211-N for generating downstream optical signals with different wavelengths, a multiplexer/demultiplexer 214 for multiplexing the downstream optical signals and demultiplexing the upstream optical signals multiplexed by the remote node 220, upstream receivers 212-1 to 212-N, and wavelength division multiplexers 213-1 to 213-N for coupling each of the downstream light sources 211-1 to 211-N and the upstream receivers 212-1 to 212-N to the multiplexer/demultiplexer 214.

Each of the downstream light sources 211-1 to 211-N generates a downstream optical signal with a different wavelength. Each downstream optical signal includes downstream subcarrier channels with different frequencies. Each of the upstream receivers 212-1 to 212-N receives an upstream optical signal with a corresponding wavelength from the corresponding wavelength-selective couplers 213-1 to 213-N, and detects data from the upstream subcarrier channels carried in an upstream optical signal with a corresponding wavelength.

The multiplexer/demultiplexer 214 outputs multiplexed downstream optical signals to the remote node 220, and demultiplexes upstream optical signals multiplexed by the remote node 220 to output the demultiplexed upstream optical signals to the upstream receivers 212-1 to 212-N through the wavelength-selective couplers 213-1 to 213-N, respectively. The wavelength-selective couplers 213-1 to 213-N output an upstream optical signal with a corresponding wavelength from among upstream optical signals demultiplexed by the multiplexer/demultiplexer 214 to the corresponding upstream receivers 212-1 to 212-N, respectively, and output a downstream optical signal generated by the corresponding downstream light sources 211-1 to 211-N to the multiplexer/demultiplexer 214.

The remote node 220 includes one or more converters 230-1 to 230-N, a multiplexer/demultiplexer 221 for multiplexing upstream optical signals and demultiplexing multiplexed downstream optical signals, and a plurality of intensity splitters 235-1 to 235-N. The multiplexer/demultiplexer 221 demultiplexes downstream optical signals multiplexed by the central office 210 and outputs the demultiplexed downstream optical signals to corresponding converters 230-1 to 230-N. The multiplexer/demultiplexer 221 multiplexes upstream optical signals input from each of the converters 230-1 to 230-N and outputs the multiplexed upstream optical signals to the central office 210.

Each of the intensity splitters 235-1 to 235-N splits a downstream optical signal with a wavelength, which is input through the corresponding converters 230-1 to 230-N, according to intensities, and outputs the split downstream optical signal to a plurality of linked ONUs 240-1 to 240-M. Each of the intensity splitters 235-1 to 235-N inputs upstream subcarrier channels generated by the corresponding linked ONUs 240-1 to 240-M to the converters 230-1 to 230-N. That is, each of the intensity splitters 235-1 to 235-N splits a downstream optical signal with an assigned wavelength according to intensities to output the split downstream optical signal to each of the linked ONUs 240-1 to 240-M, and inputs an upstream subcarrier channel with the same wavelength and a different frequency to the corresponding converters 230-1 to 230-N.

In the remote node 220 according to an embodiment of the present invention, a plurality of ONUs 240-1 to 240-M is linked to one of the intensity splitters 235-1 to 235-N as a single group. A WDM scheme is applied between the central office 210 and the remote node 220, and a SCM scheme is applied between the groups $G_1$ to $G_M$ of the ONUs 240-1 to 240-M and the intensity splitters 235-1 to 235-N of the remote node 220.

Each of the converters 230-1 to 230-N includes a first circulator 231 and a second circulator 234, which have a plurality of ports, and an electrical-to-optical converter 232 and an optical-to-electrical converter 233. The first circulator 231 has a first port coupled to the multiplexer/demultiplexer 221 of the remote node 220, a second port coupled to the electrical-to-optical converter 232, and a third port coupled to the second circulator 234. The second circulator 234 is coupled to both the optical-to-electrical converter 233 and the corresponding intensity splitter 235-1. That is, a downstream optical signal with a corresponding wavelength input to the first circulator 231 is output to the corresponding intensity splitters 235-1 through the second circulator 234. Upstream subcarrier channels with the same wavelength input to the intensity splitters 235-1 are input to the optical-to-electrical converter 233 through the second circulator 234.

The optical-to-electrical converter 233 photoelectrically converts upstream subcarrier channels input from the second circulator 234 into the electrical data, and outputs the converted electrical data to the electrical-to-optical converter 232. The electrical-to-optical converter 232 electro-optically converts the electrical data into an upstream optical signal with the same wavelength, and outputs the converted upstream optical signal to the multiplexer/demultiplexer 221 through the first circulator 231.

The ONUs 240-1 to 240-M are included in one or more groups $G_1$ to $G_M$ receiving a downstream optical signal with the same wavelength from the corresponding intensity splitters 235-1 to 235-N. Further, each of the ONUs 240-1 to 240-M includes a downstream receiver 242, an upstream light source 243, and a wavelength-selective coupler 241. The downstream receiver 242 receives a downstream optical signal with a corresponding wavelength split by the central office 210 according to intensities. The upstream light source 243 generates an upstream subcarrier channel with an assigned frequency. The wavelength-selective coupler 241 couples both the upstream light source 243 and the downstream receiver 242 to the corresponding intensity splitter 235-1 of the remote node 220.

The downstream receiver 242 may include an electrical band filter for selecting only a downstream subcarrier channel with a corresponding frequency among input downstream optical signals, and a detection means for detecting data from a corresponding downstream channel.

The upstream light source 243 generates an upstream subcarrier channel with an assigned frequency and outputs the generated subcarrier channel to the remote node 220 through a corresponding wavelength-selective coupler.

Figure 3:
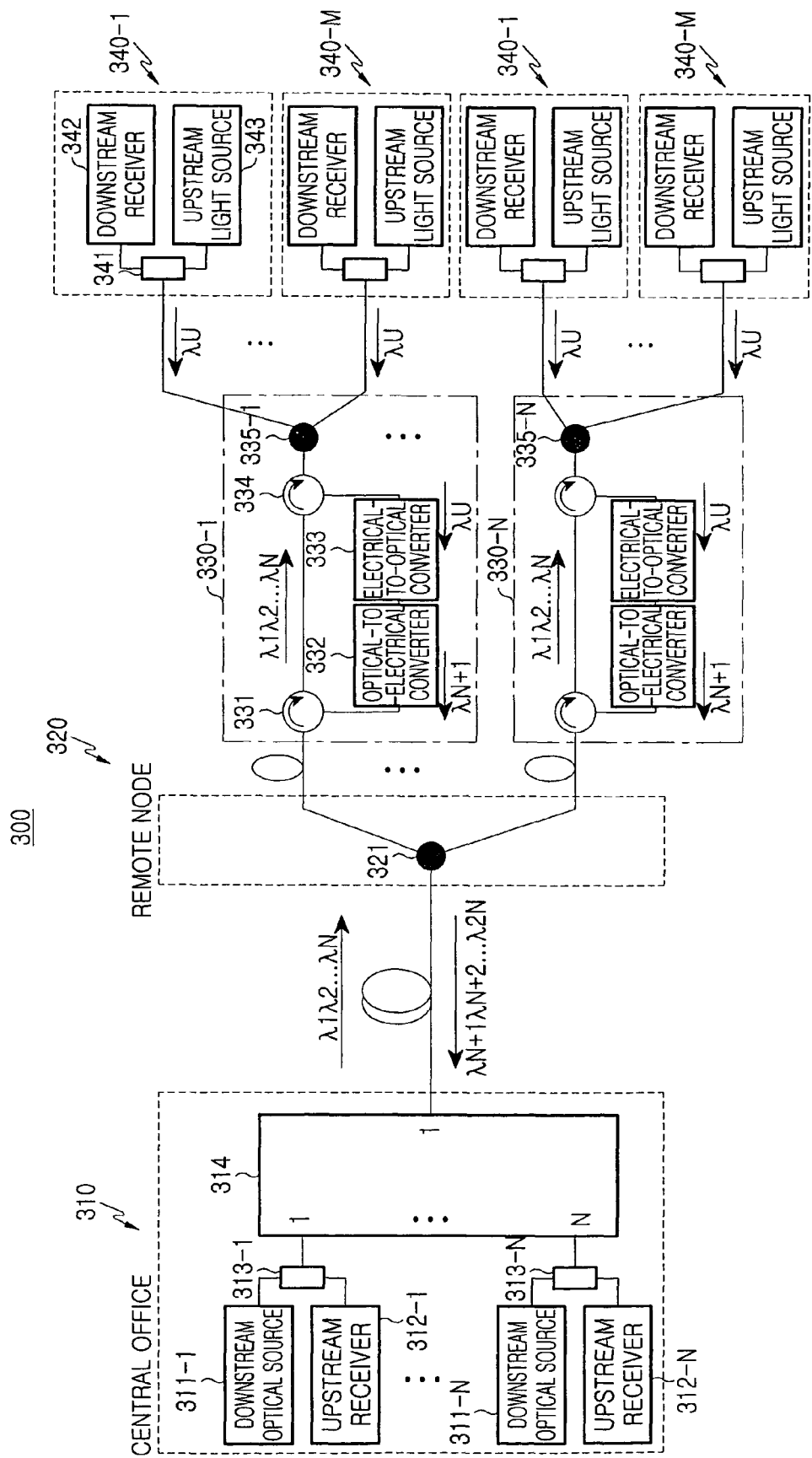
FIG. 3 is a diagram illustrating a PON according to a second embodiment of the present invention.

FIG. 3 is a diagram illustrating a PON according to a second embodiment of the present invention. As shown, the PON 300 according to the present embodiment includes a central office 310, a remote node 320, a plurality of ONUs 340-1 to 340-M, and converters 330-1 to 330-N. The central office 310 generates multiplexed downstream optical signals and receives upstream optical signals. The remote node 320 splits the downstream optical signals according to intensities and outputs upstream optical signals to the central office 310. Each of the ONUs 340-1 to 340-M generates an upstream subcarrier channel carrying electrical data of an assigned frequency.

The central office 310 includes a plurality of downstream light sources 311-1 to 311-N, a multiplexer/demultiplexer 314, upstream receivers 312-1 to 312-N, and a plurality of wavelength-selective couplers 313-1 to 313-N. The downstream light sources 311-1 to 311-N generate downstream optical signals. The multiplexer/demultiplexer 314 multiplexes the downstream optical signals to output the multiplexed downstream optical signals to the remote node 320, and demultiplexes multiplexed upstream optical signals input from the remote node 320. The upstream receivers 312-1 to 312-N detects electrical data carried in each of the subcarrier channels from the upstream optical signal with a corresponding wavelength demultiplexed by the multiplexer/demultiplexer 314. The wavelength-selective couplers 313-1 to 313-N couples both the corresponding upstream receivers 312-1 to 312-N and the downstream light sources 311-1 to 311-N to the multiplexer/demultiplexer 314.

The remote node 320 includes a first intensity splitter 321. The first intensity splitter 321 splits the multiplexed downstream optical signals according to intensities, outputs the split downstream optical signals to each of the converters 330-1 to 330-N, and outputs upstream optical signals with different wavelengths to the central office 310, the upstream optical signals being input from each of the converters 330-1 to 330-N.

Each of the converters 330-1 to 330-N is coupled to corresponding groups $G_1$ and $G_2$ constituting plurality of the of ONUs 340-1 to 340-M to which downstream optical signals with the same wavelength has been assigned. Each of the converters 330-1 to 330-N includes a first circulator 331, a second circulator 334, an electrical-to-optical converter 332, an optical-to-electrical converter 333, and a second intensity splitter 335. Downstream optical signals with different wavelengths are assigned to the groups $G_1$ and $G_2$. The second intensity splitter 335 is linked to each of the corresponding ONUs 340-1 to 340-M.

The optical-to-electrical converter 333 photoelectrically converts upstream subcarrier channels input from the ONUs 340-1 to 340-M of a corresponding group into electrical data, and outputs the converted electrical data to a corresponding electrical-to-optical converter 332. The electrical-to-optical converter 332 electro-optically converts the electrical data into an upstream optical signal with the same wavelength and outputs the converted upstream optical signal to the first circulator 331.

Figure 4:
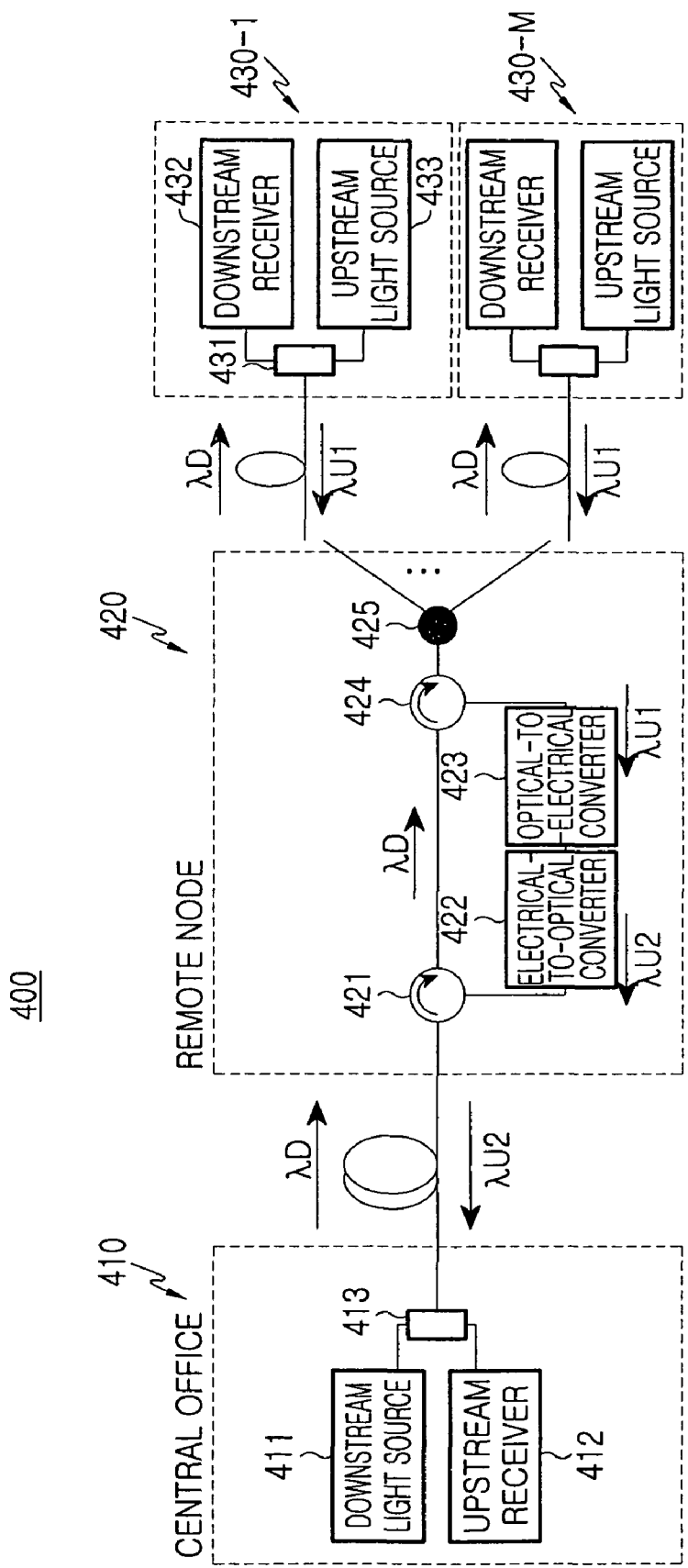
FIG. 4 is a diagram illustrating a PON according to a third embodiment of the present invention.

FIG. 4 is a diagram illustrating a PON according to a third embodiment of the present invention. As shown, the PON 400 according to the present embodiment includes a central office 410 for generating a downstream optical signal, a remote node 420, and a plurality of ONUs 430-1 to 430-M.

The central office 410 includes a downstream light source 411, an upstream receiver 412, and a wavelength-selective coupler 413. The downstream light source 411 generates a downstream optical signal including downstream channels with different frequencies. The upstream receiver 412 receives an upstream optical signal including upstream subcarrier channels with different frequencies and detects electrical data from each upstream channel. The wavelength-selective coupler 413 couples both the downstream light source 411 and the upstream receiver 412 to the remote node 420.

Each of the ONUs 430-1 to 430-M includes an upstream light source 433 for generating upstream subcarrier channels with assigned frequencies, a downstream receiver 432 for detecting data from downstream subcarrier channels with assigned frequencies, and a wavelength-selective coupler 431 for coupling both the upstream light source 433 and the downstream receiver 432 to the remote node 420.

The remote node 420 includes a first circulator 421, a second circulator 424, an electrical-to-optical converter 422, an optical-to-electrical converter 423, and an intensity splitter 425.

The first circulator 421 outputs a downstream optical signal, which is input from the central office 410, to the second circulator 424, and outputs an upstream optical signal, which is input from the electrical-to-optical converter 422, to the central office 410. The second circulator 424 outputs a downstream optical signal to the intensity splitter 425, and outputs upstream subcarrier channels, which is input from the intensity splitter 425, to the optical-to-electrical converter 423.

The optical-to-electrical converter 423 photoelectrically converts upstream subcarrier channels into each electrical data and outputs the converted electrical data to the electrical-to-optical converter 422. The electrical-to-optical converter 422 electro-optically converts electrical data into an upstream optical signal and outputs the converted upstream optical signal to the first circulator 421.

The intensity splitter 425 splits the downstream optical signal according to intensities to output the split downstream optical signal to each of the ONUs 430-1 to 430-M, and outputs upstream subcarrier channels, which are input from the ONUs 430-1 to 430-M, to the second circulator 434.

Each of the ONUs 430-1 to 430-M includes an upstream light source 433 for generating an upstream subcarrier channel with an assigned frequency, a downstream receiver 432 for detecting a downstream subcarrier channel with an assigned frequency from downstream optical signals, and a wavelength selective coupler 431 for coupling both the upstream light source 433 and the downstream receiver 432 to the remote node 420.

The downstream receiver 432 may include an electrical band pass filter capable of passing only an assigned frequency and a detection means for detecting data from a downstream subcarrier channel with an assigned frequency. The upstream light source 433 may use a low cost luminescent diode (LED), a Fabry-Perot Laser Diode (FP-LD), etc.

According to the present invention as described above, upstream optical signals obtained by performing photoelectric conversion and electrooptic conversion for upstream subcarriers, so that it is possible to construct an optical subscriber network even without incorporating an expensive light source.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A passive optical network comprising:
   a central office for generating downstream optical signals and receiving multiplexed upstream optical signals;
   a plurality of optical network units for receiving corresponding downstream optical signals and for generating subcarrier channels carrying electrical data of assigned frequencies; and
   a remote node having at least one converter for photoelectrically converting the channels into electrical data and for electro-optically converting the electrical data into at least one upstream optical signal, wherein the converter comprises:
an optical-to-electrical converter for photoelectrically converting corresponding subcarrier channels into electrical data;
an electrical-to-optical converter for electro-optically converting the electrical data converted by the optical-to-electrical converter into an upstream optical signal with an equal wavelength;
a first circulator for outputting the upstream optical signal converted by the electrical-to-optical converter to the central office and for outputting a corresponding downstream optical signal to a second circulator; and
the second circulator for outputting the corresponding downstream optical signal, which is received from the first circulator, to corresponding optical network units and for outputting the subcarrier channels from the corresponding optical network units to the optical-to-electrical converter.

2. The passive optical network as claimed in claim 1, wherein the central office comprises:
a plurality of downstream light sources for generating the downstream optical signals;
a multiplexer/demultiplexer for multiplexing the downstream optical signals to output the multiplexed downstream optical signals to the remote node and for demultiplexing multiplexed upstream optical signals input from the remote node;
an upstream receiver for detecting electrical data carried in each of the subcarrier channels from an upstream optical signal with a corresponding wavelength demultiplexed by the multiplexer/demultiplexer; and
a wavelength-selective coupler for coupling both the corresponding upstream receiver and the downstream light source to the multiplexer/demultiplexer.

3. The passive optical network as claimed in claim 1, wherein each of the optical network units comprises:
a downstream receiver for receiving a corresponding downstream optical signal with a corresponding wavelength split by the remote node;
an upstream light source for generating a subcarrier channel belonging to an assigned frequency; and
a wavelength-selective coupler for coupling both the upstream light source and the downstream optical receiver to the remote node.

4. The passive optical network as claimed in claim 3, wherein the upstream light source includes a luminescent diode (LED) or a Fabry-Perot Laser.

5. The passive optical network as claimed in claim 1, wherein the remote node further comprises:
a multiplexer/demultiplexer for demultiplexing downstream optical signals multiplexed by the central office to output the demultiplexed downstream optical signals to corresponding converters and for multiplexing upstream optical signals input from the converters to output the multiplexed upstream optical signals to the central office; and
an intensity splitter for splitting a downstream optical signal with a corresponding wavelength according to intensities, for outputting the split downstream optical signal to corresponding linked optical network units, and for outputting subcarrier channels input from the corresponding linked optical network units to a corresponding converter.

6. The passive optical network as claimed in claim 5, wherein a SCM scheme is applied between the plurality of optical network units and the intensity splitter of the remote node.

7. The passive optical network as claimed in claim 1, wherein the remote node further includes:
a first intensity splitter for splitting the downstream optical signals according to intensities, for outputting the split downstream optical signals to each of corresponding converters and for outputting upstream optical signals with different wavelengths to the central office; and
a second intensity splitter for splitting a downstream optical signal with a corresponding wavelength according to intensities, for outputting the split downstream optical signal to corresponding linked optical network units, and for outputting subcarrier channels input from the corresponding linked optical network units to a corresponding converter.

8. The passive optical network as claimed in claim 1, wherein a WDM scheme is applied between the central office and the remote node.

9. A passive optical network comprising:
a central office for generating multiplexed downstream optical signals and for receiving upstream optical signals;
a remote node for splitting the downstream optical signals and for outputting upstream optical signals to the central office;
a plurality of optical network units for receiving downstream optical signals and for generating subcarrier channels carrying electrical data of assigned frequencies; and
at least one converter for photoelectrically converting the channels into electrical data, for electro-optically converting the electrical data into at least one upstream optical signal with an equal wavelength to output the converted upstream optical signal to the remote node, and for splitting a corresponding downstream optical signal to output the split downstream optical signals to corresponding linked optical network units, wherein the converter comprises:
an optical-to-electrical converter for photoelectrically converting subcarrier channels input from the corresponding linked optical network units into each electrical data;
an electrical-to-optical converter for electro-optically converting the electrical data converted by the optical-to-electrical converter into an upstream optical signal with an equal wavelength; and
a first circulator for outputting the upstream optical signal converted by the electrical-to-optical converter to the remote node and for receiving the corresponding downstream optical signal from the remote node.

10. The passive optical network as claimed in claim 9, wherein the central office comprises:
a plurality of downstream light sources for generating downstream optical signals;
a multiplexer/demultiplexer for multiplexing the downstream optical signals to output the multiplexed downstream optical signals to the remote node and for demultiplexing multiplexed upstream optical signals input from the remote node;
an upstream receiver for detecting electrical data carried in each of the subcarrier channels from an upstream optical signal with a corresponding wavelength demultiplexed by the multiplexer/demultiplexer; and
a wavelength-selective coupler for coupling both the corresponding upstream receiver and the downstream light source to the multiplexer/demultiplexer.

11. The passive optical network as claimed in claim 9, wherein the remote node includes a first intensity splitter for splitting the downstream optical signals multiplexed by the central office according to intensities to output the split downstream optical signals to corresponding converters and for outputting upstream optical signals with different wavelengths, which are input from the converters, to the central office.

12. The passive optical network as claimed in claim 11, wherein the converter further comprises:
   a second intensity splitter for splitting the corresponding downstream optical signal input through the first circulator according to intensities to output the split downstream optical signals to the corresponding linked optical network units and for receiving subcarrier channels from the corresponding optical network units; and
   a second circulator for outputting the subcarrier channels, which are input from the second intensity splitter, to the optical-to-electrical converter and for outputting the corresponding downstream optical signal, which is input from the first circulator, to the second intensity splitter.

* * * * *